United States Patent
Yuan et al.

(10) Patent No.: US 8,655,060 B2
(45) Date of Patent: Feb. 18, 2014

(54) NIGHT-SCENE LIGHT SOURCE DETECTING DEVICE AND NIGHT-SCENE LIGHT SOURCE DETECTING METHOD

(75) Inventors: Xun Yuan, Beijing (CN); Zhongchao Shi, Beijing (CN); Cheng Zhong, Beijing (CN); Tong Liu, Bejing (CN); Gang Wang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 172 days.

(21) Appl. No.: 13/333,492

(22) Filed: Dec. 21, 2011

(65) Prior Publication Data
US 2012/0170839 A1    Jul. 5, 2012

(30) Foreign Application Priority Data
Dec. 29, 2010  (CN) .......................... 2010 1 0611906

(51) Int. Cl.
*G06K 9/00*    (2006.01)
(52) U.S. Cl.
USPC .......................................................... 382/165
(58) Field of Classification Search
USPC .................. 382/162, 165, 274; 348/673, 687
See application file for complete search history.

(56) References Cited

U.S. PATENT DOCUMENTS

| 7,551,207 | B2 | 6/2009 | Yuyama |
| 8,368,783 | B2 * | 2/2013 | Huang ........................... 348/252 |
| 2005/0047771 | A1 | 3/2005 | Yuyama |
| 2009/0153695 | A1 | 6/2009 | Kikuchi |
| 2009/0185055 | A1 | 7/2009 | Ono |
| 2010/0232705 | A1 | 9/2010 | Li et al. |
| 2010/0322510 | A1 | 12/2010 | Yuan et al. |

FOREIGN PATENT DOCUMENTS

WO    WO 2005/020589    3/2005

OTHER PUBLICATIONS

Vladimir N. Vapnik, "The Nature of Statistical Learning Theory," *Statistics for Engineering and Information Science*, Michael Jordan et al., ed., 1995.
Chinese Office Action (and English translation) dated Jun. 9, 2013 issued in corresponding Chinese Application No. 201010611906.9.

* cited by examiner

*Primary Examiner* — Jose Couso
(74) *Attorney, Agent, or Firm* — Harness, Dickey & Pierce, P.L.C.

(57) ABSTRACT

A night-scene light source detecting device includes a pixel value obtaining unit configured to obtain a pixel value of each pixel in an input image; a night-scene-feature extraction unit provided for extracting a zone area of a mean corrected-brightness value and a high corrected-brightness value of the input image as two night-scene features based on the pixel value of each pixel in the input image; a night-scene image detection unit provided for determining whether the input image is a night-scene image or not based on the two night-scene features; a specific color detection unit provided for detecting whether each pixel belongs to specific color or not; and a night-scene light source determining unit provided for determining whether the night-scene image is picked up under irradiation by the specific light sources in a night scene or not based on the result of the specific color detection.

9 Claims, 7 Drawing Sheets

NIGHT-SCENE LIGHT SOURCE DETECTING DEVICE AND NIGHT-SCENE LIGHT SOURCE DETECTING METHOD

BACKGROUND OF THE INVENTION

1. Field of the Invention

The present invention relates to a night-scene light source detecting device and a night-scene light source detecting method for determining whether an image is picked up under irradiation by specific light sources in night scene or not.

2. Description of the Related Art

In the process of image forming by using an image forming device such as a digital camera or a video pickup camera, the wrong white balance processing often occurs, thereby causing image color distortion. Accordingly, night-scene light source detection can be used in a function of intelligent scene identification and automatic white balance controlling of an image forming device such as a digital camera or a video pickup camera, etc.

U.S. Patent Application Publication No. US2009/0153695A1 discloses a night-scene detecting method discussed below, in which if the mean brightness of the picked up image is less than a predetermined threshold and the ratio of the area of high-light zone to the area of all the image is greater than a predetermined threshold, it is determined that the image belongs to a night-scene image.

U.S. Patent Application Publication No. US2009/0185055A1 discloses a night-scene detecting method mainly using six features: 1) brightness value corresponding to the median in the histogram, 2) peak value in the histogram, 3) bottom width of the histogram, 4) proportion of an underexposed region in the histogram, 5) proportion of the left half of the whole histogram, and 6) binarization threshold obtained by using a discriminant analysis method.

The problem commonly existing in the above prior technologies of night-scene detection is simple night-scene detection can only provide necessary parameter information when picking up an image, such as the setting of exposure time, sensitivity or aperture. However, there often exist different light sources in the night scene, and they could cause wrong white balance processing, thereby causing distortion of the image.

SUMMARY OF THE INVENTION

The present invention is made in light of the problems, and may provide a night-scene light source detecting device and a night-scene light source detecting method for determining whether an image is picked up under irradiation by specific light sources in a night scene or not. The night-scene light source detecting device and the night-scene light source detecting method of the present invention can be used in an image forming device such as a digital camera or a video pickup camera, etc., and determines automatically whether an image is picked up under irradiation by specific light sources in a night scene or not.

According to an aspect of the present invention, a night-scene light source detecting device for determining whether an image is picked up under irradiation by specific light sources in a night scene or not includes a pixel value obtaining unit configured to obtain a pixel value of each pixel in an input image; a night-scene-feature extraction unit configured to be connected to the pixel value obtaining unit, and be provided for extracting a zone area of a mean corrected-brightness value and a high corrected-brightness value of the input image as two night-scene features on the basis of the pixel value of each pixel in the input image obtained by the pixel value obtaining unit; a night-scene image detection unit configured to be connected to the night-scene-feature extraction unit, and be provided for determining that the input image is either a night-scene image or a non-night-scene image on the basis of the two night-scene features extracted by the night-scene-feature extraction unit; a specific color detection unit configured to be connected to the night-scene image detection unit, and be provided for detecting whether each pixel in a night-scene image detected by the night-scene image detection unit belongs to a specific color or not; and a night-scene light source determining unit configured to be connected to the specific color detection unit, and be provided for determining whether the night-scene image is picked up under irradiation by specific light sources in the night-scene or not on the basis of the result of the specific color detection of the specific color detection unit.

In the night-scene light source detecting device, the input image is a multilevel color image, and the pixel value includes a brightness channel value, a red channel value, a green channel value, and a blue channel value for the pixel.

In the night-scene light source detecting device, the input image is an image having a lower resolution than an image finally formed by an image forming device does.

In the night-scene light source detecting device, the night-scene-feature extraction unit includes a brightness correcting unit configured to correct a brightness value of each pixel in the input image, thereby obtaining a corrected-brightness value; and a night-scene-feature computing unit configured to compute the zone area of the corrected mean corrected-brightness value and the corrected high corrected-brightness value of the input image as the extracted two night-scene features.

In the night-scene light source detecting device, the night-scene image detection unit determines that the input image is either a night-scene image or a non-night-scene image on the basis of the extracted two night-scene features, and outputs the input image to the specific color detection unit when it is determined that the input image is the night-scene image, and stops the process for the input image when it is determined that the input image is the non-night-scene image.

In the night-scene light source detecting device, the night-scene image detection unit obtains a classifier function by training with respect to multiple known night-scene sample images and multiple known non-night-scene sample images.

In the night-scene light source detecting device, the specific color detection unit is provided for determining that each pixel in the night-scene image is either a specific color pixel or a non-specific color pixel on the basis of a color feature of that same pixel in the night-scene image.

In the night-scene light source detecting device, the specific color detection unit obtains a classifier function by training with respect to multiple known specific color sample image pixels and multiple known non-specific color sample image pixels.

In the night-scene light source detecting device, the night-scene light source determining unit is provided for determining whether the night-scene image is picked up under irradiation by specific light sources in a night scene or not on the basis of a result of specific color detection, and the night-scene light source determining unit includes a specific color zone area computing unit for computing an area of a specific color zone in a night-scene image; a specific color zone area determining unit for determining whether the area of the specific color zone is greater than or equal to a predetermined threshold or not, wherein if the area of the specific color zone is less than the predetermined threshold, the process of the night-scene light source determining unit is finished; and a specific color zone location determining unit for determining whether a location of the specific color zone is contiguous with a location of a high corrected-brightness-value zone or not when the area of the specific color zone is greater than or equal to the predetermined threshold; wherein the night-scene light source determining unit determines that the night-scene image is picked up under irradiation by specific light sources in a night scene when the location of the specific color zone is contiguous with the location of the high corrected-brightness-value zone.

According to another aspect of the present invention, a night-scene light source detecting method for determining whether an image is picked up under irradiation by specific light sources in a night scene or not includes a pixel value obtaining step of obtaining a pixel value of each pixel in a input image; a night-scene-feature extraction step of extracting a zone area of a mean corrected-brightness value and a high corrected-brightness value of the input image as two night-scene features on the basis of the obtained pixel value of each pixel in the input image in the pixel value obtaining step; a night-scene image detection step of determining that the input image is either a night-scene image or a non-night-scene image on the basis of the extracted two night-scene features in the night-scene-feature extraction step; a specific color detection step of detecting whether each of the detected pixels in a night-scene image in the night-scene image detection step belongs to a specific color or not; and a night-scene light source determining step of determining whether the night-scene image is picked up under irradiation by specific light sources in a night scene or not on the basis of the result of the specific color detection in the specific color detection step.

According to an aspect of the present invention, the night-scene light source detecting device for determining whether an image is picked up under irradiation by specific light sources in a night scene or not and the night-scene light source detecting method for determining whether an image is picked up under irradiation by specific light sources in a night scene or not of the present invention can be implemented in various image forming devices for determining whether an image is picked up under irradiation by specific light sources in a night scene or not, and can be implemented before the final image forming, and can also be implemented in the post-process of the final image forming.

Other objects, features, advantages and industrial importance of the present invention will become more apparent from the following detailed description when read in conjunction with the accompanying drawings.

DETAILED DESCRIPTION OF THE PREFERRED EMBODIMENTS

In the following, embodiments of the present invention are described with reference to the accompanying drawings.

Figure 1:
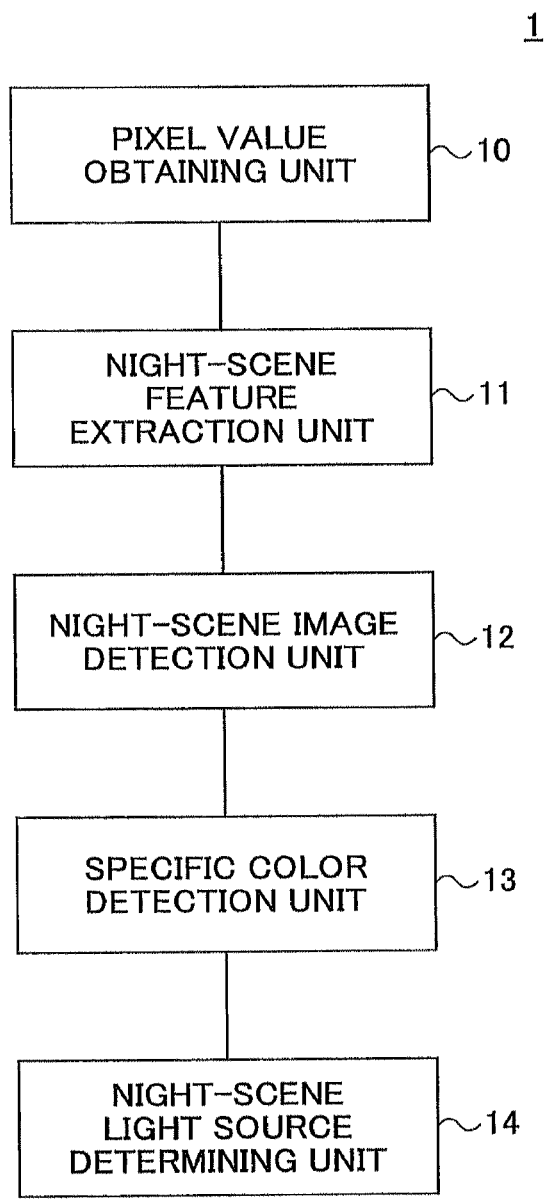
FIG. 1 is an overall block diagram illustrating the night-scene light source detecting device according to an embodiment of the present invention.

First, FIG. 1 is an overall block diagram illustrating the night-scene light source detecting device according to an embodiment of the present invention.

As illustrated in FIG. 1, a night-scene light source detecting device 1 for determining whether an image is picked up under irradiation by specific light sources in a night scene or not according to an embodiment of the present invention includes a pixel value obtaining apparatus 10 for obtaining a pixel value of each pixel in an input image; a night-scene-feature extraction apparatus 11 connected to the pixel value obtaining apparatus 10, and provided for extracting a zone area of a mean corrected-brightness value and a high corrected-brightness value of the input image as two night-scene features on the basis of the pixel value of each pixel in the input image obtained by the pixel value obtaining apparatus 10; a night-scene image detection apparatus 12 connected to the night-scene-feature extraction apparatus 11, and provided for determining that the input image is either a night-scene image or a non-night-scene image on the basis of the two night-scene features extracted by the night-scene-feature extraction apparatus 11; a specific color detection apparatus 13 connected to the night-scene image detection apparatus 12, and provided for detecting that whether each pixel in a night-scene image detected by the night-scene image detection apparatus 12 belongs to a specific color or not; and a night-scene light source determining apparatus 14 connected to the specific color detection apparatus 13, and provided for determining whether the night-scene image is picked up under irradiation by specific light sources in a night scene or not on the basis of the result of the specific color detection of the specific color detection apparatus 13.

The night-scene light source detecting device 1 according to an embodiment of the present invention may process a multilevel color image formed by an image forming device such as a digital camera or a video pickup camera. The pixel value obtaining apparatus 10 may obtain pixel values of four channels of each pixel in the multilevel color image, that is, a brightness channel value L, a red channel value R, a green channel value G, and a blue channel value B for the pixel. R, G and B are brightness values of red, green and blue, respectively. All values of R, G, B and L may be obtained automatically with methods well-known in the art by a related-art image forming device in the process of image capture.

The pixel value obtaining apparatus 10 obtains signals of pixel values of each pixel in the input image for doing a subsequent night-scene light source detecting process. Because the light source detecting device is intended to perform night-scene light source detection, it may process an image such as a supervisory signal image, having a lower resolution than an image finally formed by an image forming device does. By doing this, because the processed image is an image having a lower resolution than an image finally formed by the image forming device does, it capable of improving the processing speed of the image, thereby it is possible to satisfy such requests of real-time processing in the image forming device. A supervisory signal image of the low resolution may be obtained by being detecting automatically and directly by the image forming device such as a digital camera or a video pickup camera. As an actual example, an image displayed on a LCD screen before being picked up by such a digital camera or a video pickup camera has a lower resolution than an image picked up under similar conditions by the image forming device. It is obvious that the light source detecting device 1 of embodiments of the present invention may also process the image finally picked up by the image forming device, and it is not limited to those described above.

Figure 2:
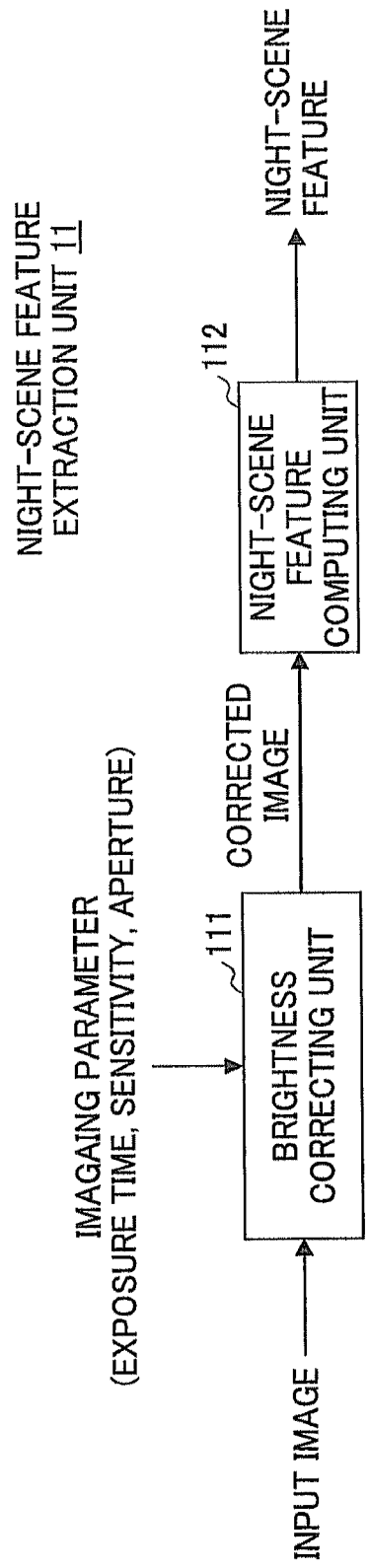
FIG. 2 is a configuration schematic drawing illustrating the night-scene-feature extraction apparatus according to an embodiment of the present invention.

FIG. 2 is a configuration schematic drawing illustrating the night-scene-feature extraction apparatus 11 according to an embodiment of the present invention. The night-scene-feature extraction apparatus 11 includes a brightness correcting apparatus 111 connected to the pixel value obtaining apparatus 10, and correcting a brightness value of each pixel in the input image on the basis of the brightness information and pickup parameters (exposure time, sensitivity and aperture) of the input image, that is, computing a corrected-brightness value of each pixel in the image; and a night-scene-feature computing apparatus 112 connected to the brightness correcting apparatus 111, and computing the zone area of the mean corrected-brightness value and the high corrected-brightness value of the corrected image as the extracted two night-scene features on the basis of the image corrected by the brightness correcting apparatus 111. Here, the reason why the brightness value of each pixel in the input image obtained by the pixel value obtaining apparatus 10 is corrected is that such brightness value of each pixel in the input image obtained by the pixel value obtaining apparatus 10 is not an actual brightness value of the external environment but a brightness value of an input signal received by using the sensor of a digital camera or a video pickup camera, etc. Accordingly, it is necessary to correct the obtained brightness values on the basis of related parameters of such digital camera or video pickup camera forming the image.

Here, for example, for an ordinary image forming device such as a digital camera or a video pickup camera, $L_i$ represents the brightness value of a pixel dot i in a known image, $t_i$ represents the exposure time, ISO represents the sensitivity and F represent aperture; then the brightness correcting apparatus 111 computes the corrected brightness value Calibr_$L_i$ of the pixel dot based on the following equation (1).

$$\text{Calibr\_}L_i = L_i \times \left(\frac{0.01}{t}\right) \times \left(\frac{200}{ISO}\right) \times \left(\frac{F}{4}\right)^2$$

It is obvious for those skilled in the art that the obtained brightness value may also be corrected by using another parameter and correcting equation on the basis of the type and the model of the used image forming device, as long as the corrected brightness can reflect a true brightness in the actual environment. The present invention is not limited to those described above.

Figure 3:
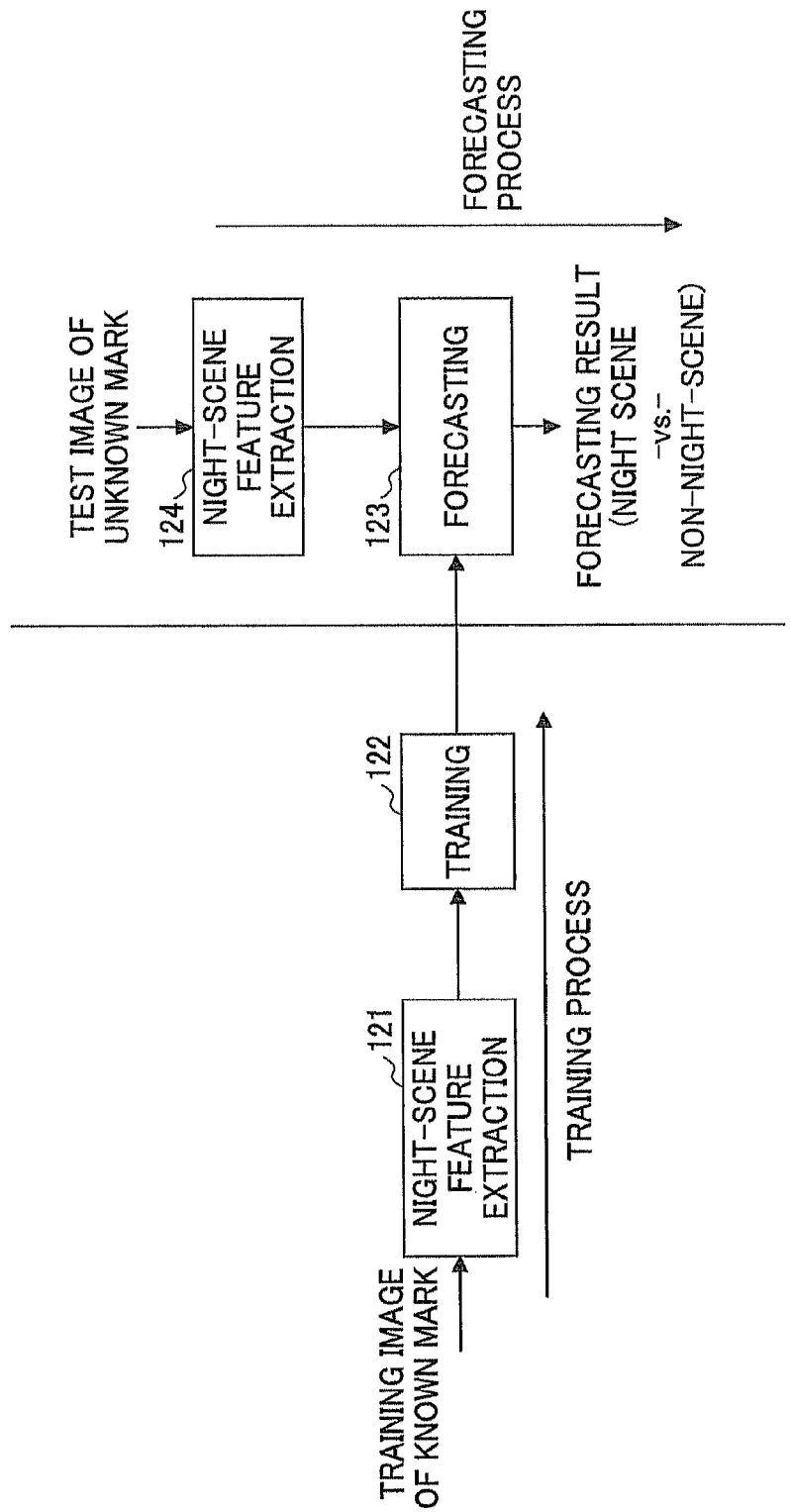
FIG. 3 is a functional schematic drawing illustrating the night-scene image detection apparatus according to an embodiment of the present invention.

FIG. 3 is a functional schematic drawing illustrating the night-scene image detection apparatus 12 according to an embodiment of the present invention. The left side of the vertical line represents the training process by using sample images, and the right side of the vertical line represents the forecasting process for performing the forecasting on the unprocessed images. In the operation 121 of the training process, the night-scene image detection apparatus 12 obtains the corrected-brightness-value of each sample image and extracts respectively two night-scene features, that is, the zone area of the mean corrected-brightness value and the high corrected-brightness value of the image.

In the operation 122, the classifier learns the difference of night-scene-feature distribution between night-scene images and non-night-scene images, and performs a classifier function for determining classification. The classifier function formed by the training operation 122 for the classifier is intended to exclude non-night-scene images and withhold night-scene images for post-processing. In embodiments of the present invention, the classifier function may be created by a well-known technology of a support vector machine (SVM) of a linear kernel function. SVM is a known algorithm as described in a document (V. Vapnik, The Nature of Statistical Learning Theory, Springer-Verlag, New York, 1995.).

In the forecasting process, the night-scene image detection apparatus 12 processes the unforecasted input image, and extracts two night-scene features of the input image in the operation 124. In the operation 123, two night-scene features of the input image are computed by using the classifier function obtained by training, and it is determined whether the input image is a night-scene image or not. The process for the input image is stopped when it is determined that the input image is a non-night-scene image, and the input image is outputted to the specific color detection apparatus 13 for post-processing when it is determined that the input image is a night-scene image.

More specifically, in the training process by the method of the support vector machine (SVM), marked night-scene images and unmarked night-scene images are regarded as positive samples and negative samples, respectively. A feature vector $f_i$ is extracted for each pixel, where i is an index number of samples, i is a natural number, and the feature vector is such two night-scene features described above. For example, after the annotation of p positive samples and q negative samples, the equation k=p+q is established. Accordingly, a feature vector set F={$f_i$}, i=1, . . . , k, and a mark set Y={$y_i$}, i=1, . . . , k are obtained. Here, $y_i$ is an type mark corresponding to $f_i$ and defined as the following equation (2).

$$y_i = \begin{cases} 1 & \text{IF } f_i \text{ REPRESENTS POSITIVE SAMPLES} \\ 0 & \text{IF } f_i \text{ REPRESENTS NEGATIVE SAMPLES} \end{cases}$$

It is necessary to select a kernel function K before the training operation 122. In the embodiment of the present invention, the following linear kernel function is defined as the following equation (3), that is, g and h are two vectors, and a kernel function K is an inner product of those vectors.

$$K(g,h) = g \cdot h$$

In the training process, nv vectors are selected from the feature vector set F based on the algorithm of the SVM training, thereby a support vector set V={$v_i$} for determining the classification function is established, wherein i is an index number and i=1, . . . , nv. In addition, a weight $a_i$ is distributed to each vector $v_i$ based on the algorithm.

In the process of test processing, the feature vector v of an unprocessed test image (the above two night-scene features are extracted) may be determined by using the classification function fun( ) defined as the following equation (4).

$$\text{fun}(v) = \sum_{i=1}^{nv} y_i a_i * K(v_i, v) + b$$

Where $y_i$ is a type mark corresponding to feature vector $v_i$, and b is a constant calculated based on the algorithm of the SVM training.

When the linear kernel function is used, the classification function can be derived as the following equation (5).

$$\begin{aligned}fun(v) &= \sum_{i=1}^{nv} y_i * a_i * (v_i, v) + b \\ &= \sum_{i=1}^{nv} y_i * a_i * (v_i \cdot v) + b \\ &= \sum_{i=1}^{nv} ((y_i * a_i * v_i) \cdot v) + b \\ &= \left(\sum_{i=1}^{nv} y_i * a_i * v_i\right) \cdot v + b \\ &= w \cdot v + b\end{aligned}$$

Because all of $y_i$, $a_i$, $v_i$ and nv are known quantities, w (the following equation (6) is represented by w) may be calculated in advance. Therefore, the determining time required for the forecasting process is not affected.

$$(\Sigma_{i=1}^{nv} y_i * a_i * v_i)$$

The type mark $y_v$ for a feature vector V of an unprocessed test image may be defined as the following equation (7).

$$y_v = \begin{cases} 1 & fun(v) \geq 0 \\ 0 & fun(v) < 0 \end{cases}$$

When the result of the feature vector v computed by the classification function fun( ) is greater than or equal to 0, the type mark of the feature vector v is classified as 1, representing that the test image corresponding to the feature vector may be classified as positive samples and it is determined that the image is a night-scene image in the embodiment of the present invention. And then a subsequent series process is processed. On the other hand, When the result of the feature vector v computed by the classification function fun( ) is less than 0, the type mark of the feature vector v is classified as 0, representing that the test image corresponding to the feature vector may be classified as negative samples and it is determined that the image is a non-night-scene image in the embodiment of the present invention. And then the process is stopped and a subsequent series process is not processed.

The above method of the support vector machine (SVM) is only an example to explain how to train and classify an unprocessed image, and it is obvious for those skilled in the art that any other known method of machine learning, such as a K-neighborhood method (K-NN) and AdaBoost may also be used for performing the training on the classifier, thereby determining whether the image is a night-scene image or not.

Figure 4:
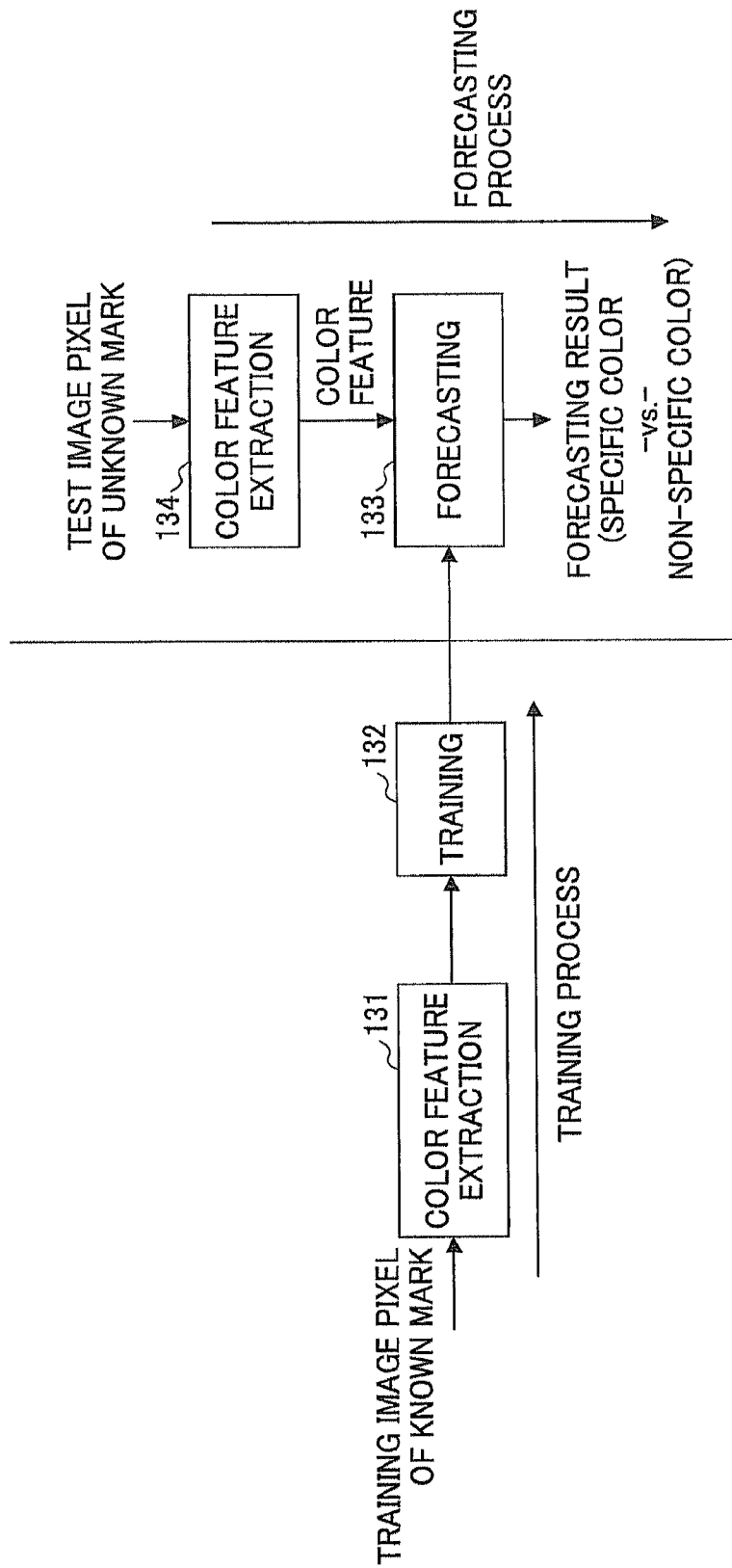
FIG. 4 is a functional schematic drawing illustrating the specific color detection apparatus according to an embodiment of the present invention.

FIG. 4 is a functional schematic drawing illustrating the specific color detection apparatus 13 according to an embodiment of the present invention. The left side of the vertical line represents the training process by using sample image pixels, and the right side of the vertical line represents the forecasting process for performing the forecasting on the unprocessed image pixels. In operation 131 of the training process, the specific color detection apparatus 13 extracts respectively R, G and B values of each sample image pixel as color features of the image pixel.

In the operation 132, the classifier learns the difference of color feature distribution between specific color image pixels and non-specific color image pixels, and forms a classifier function for classification determining. Forming the classifier function by the training operation 132 for the classifier is intended to determine that each image pixel is either a specific color image pixel or a non-specific color image pixel. In the present invention, the classifier function may be created by a well-known technology of the support vector machine (SVM) of the linear kernel function. SVM is a known algorithm as described above.

In the forecasting process, the specific color detection apparatus 13 processes the unforecasted night-scene image pixels, and extracts color features of the night-scene image pixels in the operation 134. In the operation 133, color features of the night-scene image pixels are computed by using the classifier function obtained by training, and it is determined that the night-scene image pixels are either specific color image pixels or non-specific color image pixels.

For a detailed method of specific color detection by using the support vector machine (SVM), refer to the method of night-scene detection by using the support vector machine (SVM). The distinction between those two is that the input image is replaced by the input image pixel and the operation of night-scene-feature extraction 121 is replaced by the color feature extraction 131. It is also obvious for those skilled in the art that any other known methods of machine learning, such as a K-neighborhood method (K-NN) and AdaBoost may also be used for performing the training on the classifier, thereby determining whether the image pixel is a specific color image pixel or not.

Here, the night-scene image detection apparatus 12 and the specific color detection apparatus 13 are separate apparatuses as illustrated in the embodiment of the present invention; nevertheless it is obvious for those skilled in the art that they may also be two units of a single apparatus. Accordingly, the training operation 122 in the night-scene image detection apparatus 12 and the training operation 132 in the specific color detection apparatus 13 are different operations as illustrated in FIG. 3 and FIG. 4; nevertheless it is obvious for those skilled in the art that they may also be completed by a same component. Similarly, the processed forecasting operation 123 in the night-scene image detection apparatus 12 and the processed forecasting operation 133 in the specific color detection apparatus 13 are different operations as illustrated in FIG. 3 and FIG. 4; nevertheless it is obvious for those skilled in the art that they may also be completed by a same component. Furthermore, as shown in FIG. 3, a same feature is used in the night-scene-feature extraction 121 for the training image of a known mark and the night-scene-feature extraction 124 for the test image of an unknown mark; nevertheless it is obvious for those skilled in the art that they may be completed by not only different components as described above but also a same component. Similarly, as shown in FIG. 4, a same feature is used in the color feature extraction 131 for the training image of a known mark and the color feature extraction 134 for the test image of an unknown mark; nevertheless it is obvious for those skilled in the art that they may be completed by not only different components as described above but also a same component. The embodiments of the present invention are not limited to those described above.

Figure 5:
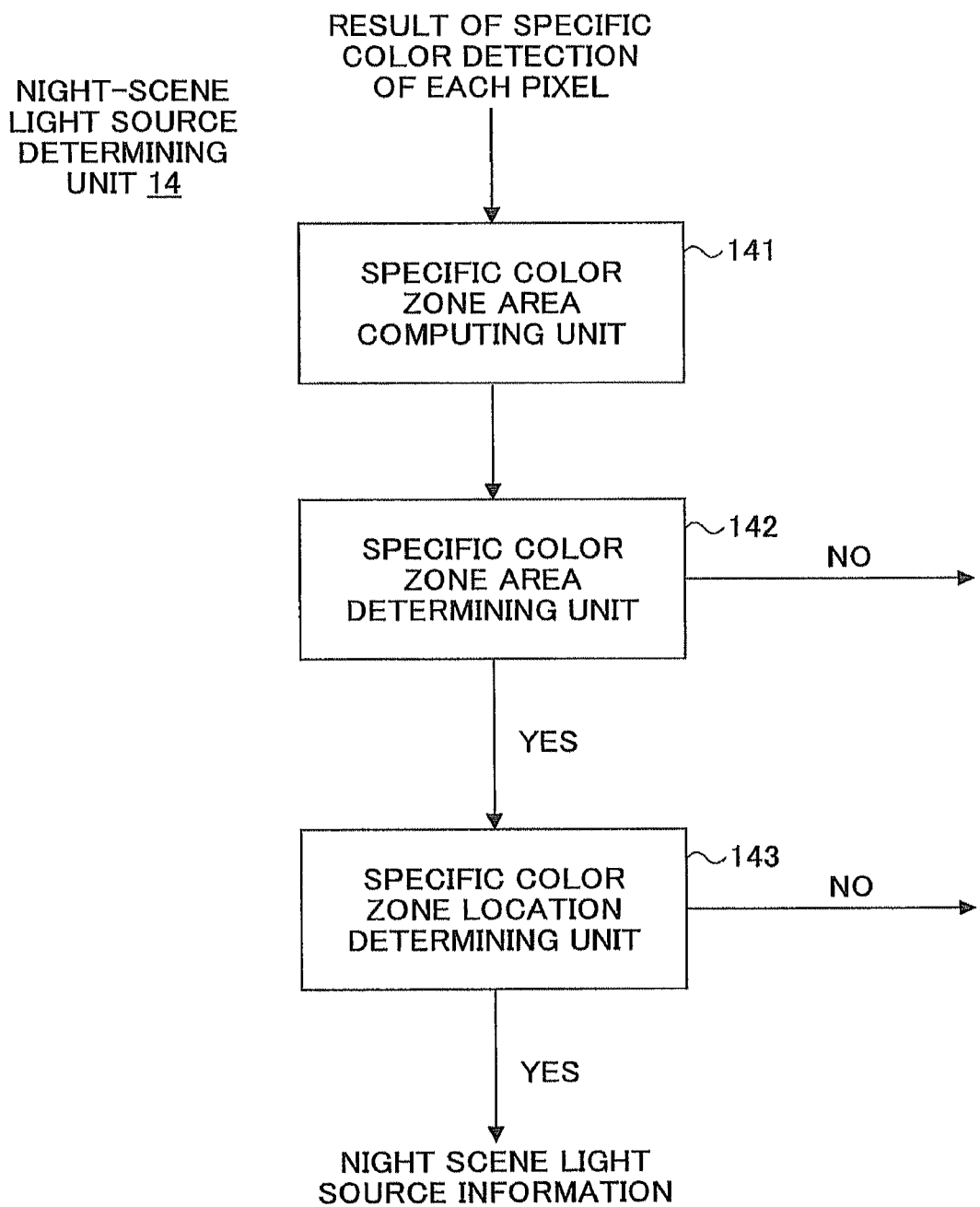
FIG. 5 is a functional schematic drawing illustrating the night-scene light source determining apparatus according to an embodiment of the present invention.

FIG. 5 is a functional schematic drawing illustrating the night-scene light source determining apparatus according to an embodiment of the present invention. The night-scene light source determining apparatus 14 includes a specific color zone area computing unit 141 connected to the specific color detection apparatus 13 and provided for computing an area of a specific color zone in a night-scene image on the basis of the result of the specific color detection of the specific color detection apparatus 13; a specific color zone area determining unit 142 for determining whether the area of the specific color zone is greater than or equal to a predetermined threshold or not, wherein if the area of the specific color zone is less than the predetermined threshold, the process for the night-scene image is finished, and if the area of the specific color zone is greater than or equal to the predetermined threshold, the subsequent determining process is processed; and a specific color zone location determining unit 143 connected to the specific color detection apparatus 13 and provided for determining whether a location of the specific color zone in the night-scene image is contiguous with a location of a high corrected-brightness-value zone or not on the basis of the result of the specific color detection of the specific color detection apparatus 13 and the corrected brightness value of each pixel in the night-scene image, wherein if the location of the specific color zone is not contiguous with the location of the high corrected-brightness-value zone, the process for the image is stopped, and if the location of the specific color zone is contiguous with the location of the high corrected-brightness-value zone, it is determined that the night-scene image is picked up under irradiation by specific light sources in a night scene.

Here, both the area and the location of the specific color zone in the night-scene image are used to determine whether the night-scene image is picked up under irradiation by specific light sources in a night scene or not in the embodiment of the present invention described above; nevertheless it is obvious for those skilled in the art that only the area of the specific color zone in the night-scene image is used to determine whether the night-scene image is picked up under irradiation by specific light sources in a night scene or not. For example, if the area of the specific color zone in the night-scene image is greater than a predetermined threshold, it is determined that the night-scene image is picked up under irradiation by specific light sources in a night scene. The present invention is not limited to those described above.

Figure 6:
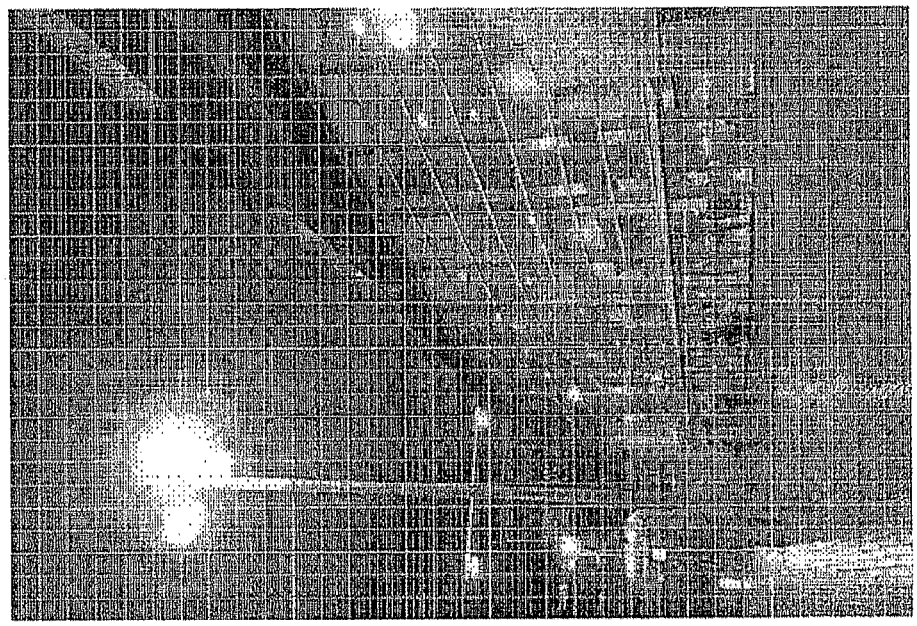
FIG. 6 is a diagram illustrating an example of green detection in the night-scene mercury lamp detection.

As illustrated in FIG. 6, the specific color detection apparatus 13 of the night-scene light source detecting device 1 of the embodiment of the present invention is a night-scene detection mercury lamp, and the result of the processed green detection is illustrated. The checks with X marks are in a green zone, and others are in a non-green zone.

Figure 7:
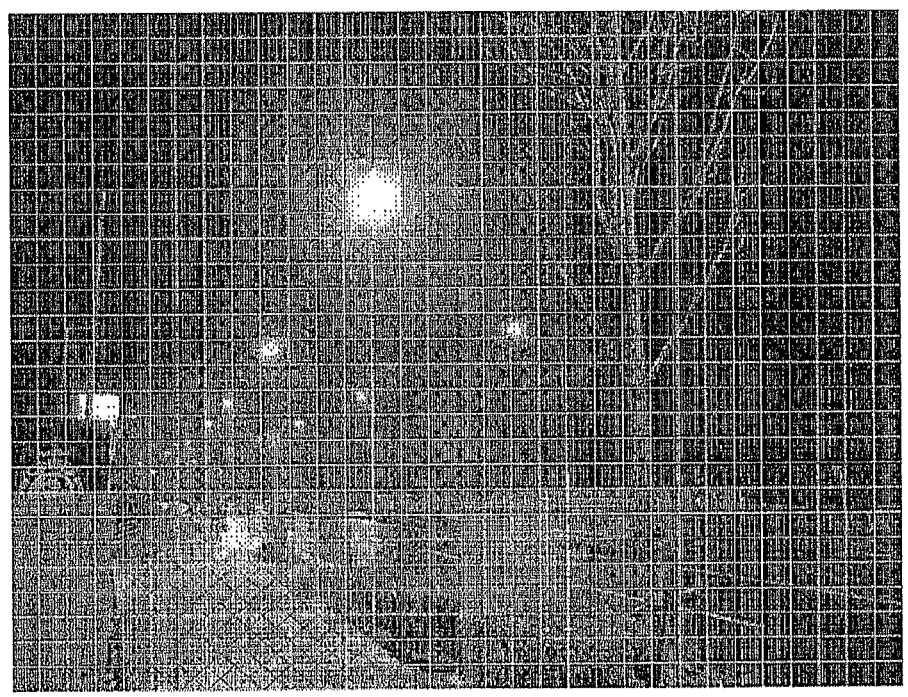
FIG. 7 is a diagram illustrating an example of orange detection in the night-scene sodium-vapor lamp detection.

As illustrated in FIG. 7, the specific color detection apparatus 13 of the night-scene light source detecting device 1 of the embodiment of the present invention is a night-scene detection sodium-vapor lamp, and the result of the processed green detection is illustrated. The checks with X marks are in an orange zone, and others are in a non-orange zone.

Figure 8:
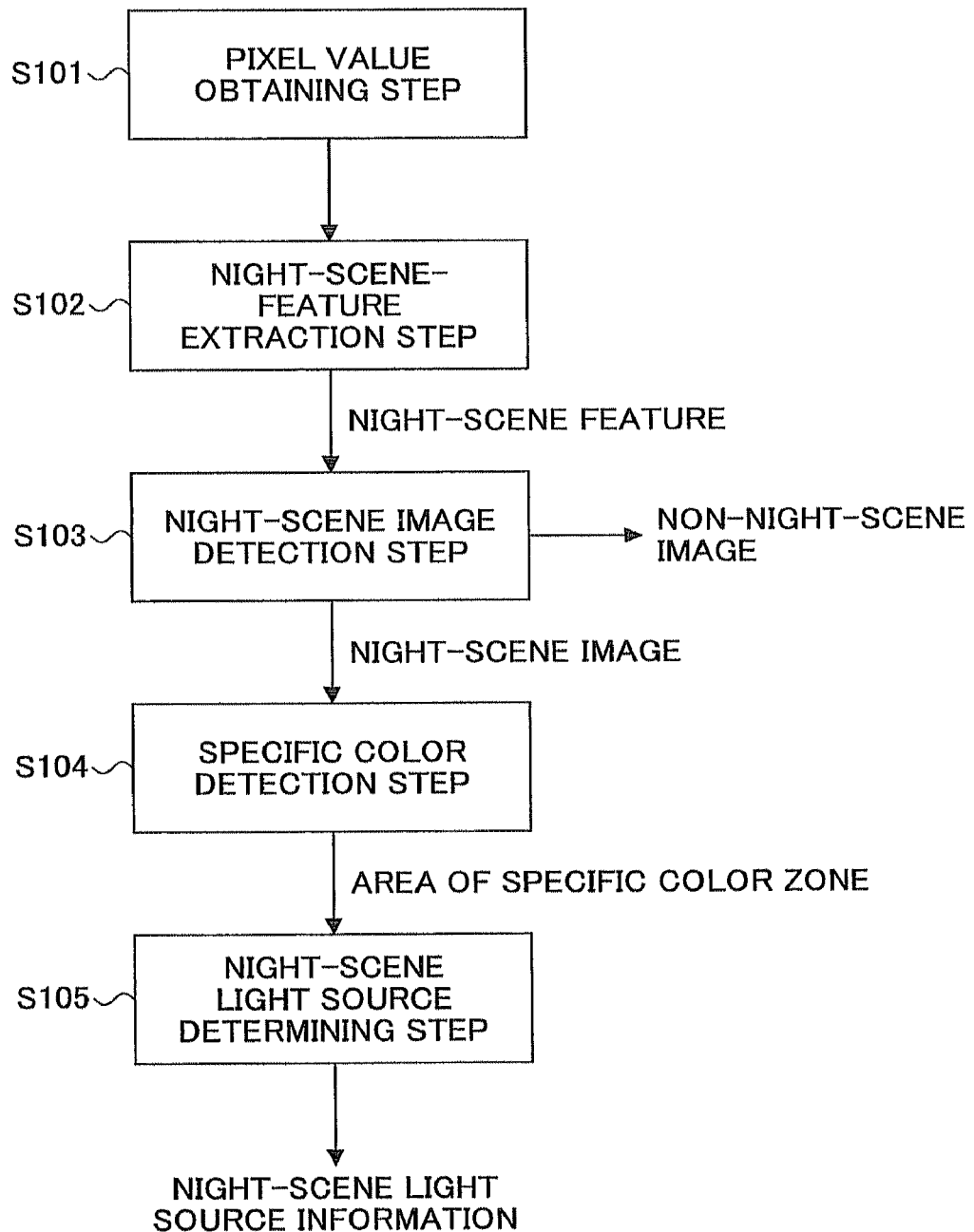
FIG. 8 is a flowchart illustrating the night-scene light source detecting method according to another embodiment of the present invention.

Another embodiment of the present invention provides a night-scene light source detecting method for determining whether an image is picked up under irradiation by specific light sources in a night scene or not. FIG. 8 is a flowchart illustrating the night-scene light source detecting method according to another embodiment of the present invention. The method includes a pixel value obtaining step S101 of obtaining a pixel value of each pixel in an input image, that may be performed by the pixel value obtaining apparatus 10 of the night-scene light source detecting device 1; a night-scene-feature extraction step S102 of extracting a zone area of a mean corrected-brightness value and a high corrected-brightness value of the input image as two night-scene features on the basis of the obtained pixel value of each pixel in the input image in the pixel value obtaining step S101, that may be performed by the night-scene-feature extraction apparatus 11; a night-scene image detection step S103 of determining that the input image is either a night-scene image or a non-night-scene image on the basis of the extracted two night-scene features in the night-scene-feature extraction step S102, that may be performed by the night-scene image detection apparatus 12; a specific color detection step S104 of detecting whether each of the detected pixels in a night-scene image in the night-scene image detection step S103 belongs to a specific color or not, that may be performed by the specific color detection apparatus 13; and a night-scene light source determining step S105 of determining whether the night-scene image is picked up under irradiation by specific light sources in a night-scene or not on the basis of the result of the specific color detection in the specific color detection step S104, that may be performed by the night-scene light source determining apparatus 14.

Since the process of steps S101 to S105 described above is the same process as the processes of all the components of the night-scene light source detecting device 1, their descriptions are omitted here.

The sequence of operations described above may be implemented by hardware, software, or a combination of hardware and software. If the sequence of operations is implemented by software, the computer programs of the operations may be installed in a built-in memory in specialized hardware, thereby causing a computer to execute the installed computer programs. Such computer programs may also be installed in a general-purpose computer capable of performing various processes, thereby causing the general-purpose computer to execute the installed computer programs.

For example, such computer programs may be stored in a recording medium such as hardware or ROM in advance, or may be temporarily or permanently stored in a removable recording medium such as a FD, a CD-ROM, a MO (magneto-optical) disk, a DVD, a magnetic disk, and semiconductor memory. Such removable recording media storing the programs may be provided as package software.

The present invention is not limited to the specifically disclosed embodiments, and variations and modifications may be made without departing from the scope of the present invention.

The present application is based on Chinese Priority Application No. 201010611906.9 filed on Dec. 29, 2010, the entire contents of which are hereby incorporated herein by reference.

What is claimed is:

1. A night-scene light source detecting device for determining whether an image is picked up under irradiation by specific light sources in a night scene or not, comprising:
    a pixel value obtaining unit configured to obtain a pixel value of each of pixels in an input image;
    a night-scene-feature extraction unit configured to be connected to the pixel value obtaining unit, and be provided for extracting a zone area of a mean corrected-brightness value and a high corrected-brightness value of the input image as two night-scene features on the basis of the pixel value of each of the pixels in the input image obtained by the pixel value obtaining unit;
    a night-scene image detection unit configured to be connected to the night-scene-feature extraction unit, and be provided for determining that the input image is either a night-scene image or a non-night-scene image on the basis of the two night-scene features extracted by the night-scene-feature extraction unit;
    a specific color detection unit configured to be connected to the night-scene image detection unit, and be provided for detecting whether each of the pixels in the night-scene image detected by the night-scene image detection unit belongs to a specific color or not; and
    a night-scene light source determining unit configured to be connected to the specific color detection unit, and be provided for determining whether the night-scene image is picked up under irradiation by specific light sources in night scene or not on the basis of the result of the specific color detection of the specific color detection unit.

2. The night-scene light source detecting device according to claim 1,
wherein the input image is a multilevel color image, and the pixel value includes a brightness channel value, a red channel value, a green channel value, and a blue channel value for the pixel.

3. The night-scene light source detecting device according to claim 1,
wherein the input image has a lower resolution than that of an image finally formed by an image forming device.

4. The night-scene light source detecting device according to claim 1, the night-scene-feature extraction unit comprising:
a brightness correcting unit configured to correct a brightness value of each of the pixels in the input image, thereby obtaining a corrected-brightness value; and
a night-scene-feature computing unit configured to compute the zone area of the corrected mean corrected-brightness value and the corrected high corrected-brightness value of the input image as the extracted two night-scene features.

5. The night-scene light source detecting device according to claim 1,
wherein the night-scene image detection unit determines that the input image is either the night-scene image or the non-night-scene image on the basis of the extracted two night-scene features, and outputs the input image to the specific color detection unit when it is determined that the input image is the night-scene image, and stops the process for the input image when it is determined that the input image is the non-night-scene image.

6. The night-scene light source detecting device according to claim 5,
wherein the night-scene image detection unit obtains a classifier function by training with respect to multiple known night-scene sample images and multiple known non-night-scene sample images.

7. The night-scene light source detecting device according to claim 1,
wherein the specific color detection unit is provided for determining that each of the pixels in the night-scene image is either a specific color pixel or a non-specific color pixel on the basis of a color feature of the same pixel in the night-scene image.

8. The night-scene light source detecting device according to claim 7,
wherein the specific color detection unit obtains a classifier function by training with respect to multiple known specific color sample image pixels and multiple known non-specific color sample image pixels.

9. The night-scene light source detecting device according to claim 1,
wherein the night-scene light source determining unit is provided for determining whether the night-scene image is picked up under irradiation by the specific light sources in night scene or not on the basis of a result of specific color detection, and the night-scene light source determining unit comprises:
a specific color zone area computing unit for computing an area of a specific color zone in a night-scene image;
a specific color zone area determining unit for determining whether the area of the specific color zone is greater than or equal to a predetermined threshold or not, wherein if the area of the specific color zone is less than the predetermined threshold, the process of the night-scene light source determining unit is finished; and
a specific color zone location determining unit for determining whether a location of the specific color zone is contiguous with a location of a high corrected-brightness-value zone or not when the area of the specific color zone is greater than or equal to the predetermined threshold;
wherein the night-scene light source determining unit determines that the night-scene image is picked up under irradiation by the specific light sources in a night scene when the location of the specific color zone is contiguous with the location of the high corrected-brightness-value zone.

* * * * *